(12) United States Patent
Clark

(10) Patent No.: US 6,740,818 B2
(45) Date of Patent: May 25, 2004

(54) CORD COVER AND DEPLOYMENT MEMBER AND METHODS OF USE

(76) Inventor: Kim Marie Clark, 544 Posey St., Harahan, LA (US) 70123

(*) Notice: Subject to any disclaimer, the term of this patent is extended or adjusted under 35 U.S.C. 154(b) by 0 days.

(21) Appl. No.: 09/995,232

(22) Filed: Nov. 27, 2001

(65) Prior Publication Data

US 2003/0098172 A1 May 29, 2003

(51) Int. Cl.[7] .................................................. H01B 7/00
(52) U.S. Cl. ........................ 174/135; 174/136; D13/156; 439/136; 29/235; 29/605
(58) Field of Search ................................. 174/135, 136; D13/156; 439/135–138, 367, 502, 445; 29/605, 606, 858, 859, 235; D11/117, 119, 143, 145, 151; D26/126, 127, 156; 429/919

(56) References Cited

U.S. PATENT DOCUMENTS

| | | | | |
|---|---|---|---|---|
| 3,716,733 A | * | 2/1973 | Keith et al. .................... 310/71 |
| 4,389,440 A | * | 6/1983 | Keith ........................ 428/34.9 |
| 4,939,778 A | * | 7/1990 | Tomberlin .................. 379/438 |
| 4,954,939 A | | 9/1990 | Hutchins |
| 4,979,614 A | * | 12/1990 | Ruhaut ........................ 206/702 |
| 5,016,859 A | * | 5/1991 | Zimmer et al. ....... 254/134.3 R |
| 5,130,496 A | * | 7/1992 | Jenkins ........................ 174/135 |
| 5,293,501 A | * | 3/1994 | Bennett et al. ............. 174/135 |
| 5,397,243 A | * | 3/1995 | MacMurdo, Sr. ........... 439/136 |
| 5,800,762 A | * | 9/1998 | Bethel ........................ 264/230 |
| 5,861,579 A | * | 1/1999 | Bickersteth et al. ........ 174/136 |
| 5,895,288 A | * | 4/1999 | Nelson ........................ 439/502 |
| 6,018,874 A | * | 2/2000 | Todd ........................... 30/210 |
| 6,233,796 B1 | * | 5/2001 | van Wassenhove et al. .. 28/100 |
| D445,093 S | | 7/2001 | Staskey |

* cited by examiner

*Primary Examiner*—Dean A. Reichard
*Assistant Examiner*—Adolfo Nino
(74) *Attorney, Agent, or Firm*—Wyatt, Tarrant & Combs, LLP

(57) ABSTRACT

A decorative electrical cord cover and deployment member comprising a removable, tubular cover constructed from a longitudinal portion of fabric material having a circular cross-section and a predetermined length and width. The longitudinal portion of fabric material has its longest edges permanently secured forming the tubular cover. The tubular cover is applied to a hollow deployment member for facilitating deployment of the cord cover onto one or more electrical cords. In the preferred embodiment, the longest edges of the fabric material are permanently secured with color coordinated sewing thread and the deployment member is cylindrical. A method for applying the cord cover onto the deployment member, as well as a method for deploying the cord cover from the deployment member onto one or more electrical cords are also disclosed.

7 Claims, 5 Drawing Sheets

CORD COVER AND DEPLOYMENT MEMBER AND METHODS OF USE

CROSS REFERENCE TO RELATED APPLICATIONS

Not applicable

STATEMENT REGARDING FEDERALLY SPONSORED RESEARCH OR DEVELOPMENT

Not applicable

REFERENCE TO A MICROFICHE APPENDIX

Not applicable

FIELD OF THE INVENTION

The present invention generally relates to decorative covers for electrical cords and methods for their use and, more specifically, to a decorative cord cover and an associated deployment member for facilitating deployment of the cord cover onto one or more electrical cords, as well as a method for applying the cord cover onto the deployment member.

BACKGROUND OF THE INVENTION

Generally, electrical fixtures, appliances, and the like for use in the home or elsewhere are supplied power through an electrical cord extending from an electrical outlet to the fixture. Often, the electrical fixture, such as a lamp, radio or other small appliance is positioned within the room, leaving the electrical cord visible to persons in the room. The visible electrical cord is not aesthetically pleasing. Additionally, multiple cords may become entangled with one another. There is thus a need for devices that accent the appearance of plug in electrical cords and coordinate the cord with the room's decor, and which can also be used to minimize or eliminate tangling of multiple cords. The foregoing problems occur not only with electrical cords, but also with other types of plug-in cords and lines that carry data, such as telephone lines, coaxial cables, and the like. As used herein, the term "electrical cord" shall mean and include all such lengthwise cords, lines and cables that are used in home and office settings.

Removable cylindrically shaped covers have been used to cover a multitude of devices including cart handles, insulating covers for fluid containers, and protective jackets for conductors, chandelier chains and the like. See for example U.S. Pat. Nos. 3,866,649; 3,654,049; 3,906,129; 3,038,558; and 4,954,939. These applications disclose covers secured around an item by a fastening device such as a zipper, extruded fastener or hook-and-loop type fastening material. All of these examples are similar in that the secured cover can be removed by simply unfastening the fastening device. However, electrical cords differ from other covered articles in that the electrical cord can be unplugged from the electrical socket, which permits removal of the cover without necessitating unfastening of a fastening device. This property of plug-in electrical cords allows for the use of permanently enclosed cord covers, in a manner unknown in the prior art.

Methods for deploying permanently enclosed cord covers onto one or more plug in cords are unknown in the art. The present invention accomplishes this task by introducing a deployment member which is used to facilitate deployment of the cord cover onto one or more electrical cords, as well as to provide a visually pleasing manner of presenting the present invention to the consumer. A method for the deployment of the cord cover onto electrical cords is more fully described below.

The novel approach of utilizing a deployment member in conjunction with the cord cover necessitates the application of the cord cover onto the deployment member as part of the manufacturing process. A method for the application of the cord cover onto the deployment member is more fully described below.

OBJECTS AND SUMMARY OF THE INVENTION

It is an object of the invention to provide a permanently enclosed cord cover for accenting one or more electrical cords.

It is another object of the invention to provide a method for deploying the cord cover disclosed herein onto one or more electrical cords, as well as to provide a visually pleasing manner of presenting the cord cover to the consumer.

It is yet another object of the invention to provide a method for applying the cord cover onto the deployment member as part of the manufacturing process.

These and other objects and advantages of the invention shall become apparent from the following general and preferred description of the invention.

Accordingly, a decorative cord cover is provided comprising, generally, a permanently enclosed tubular member preferably having a circular cross-section. The decorative cord cover is positioned onto a deployment member. In the preferred embodiment, the deployment member is a hollow, preferably cylindrical core constructed of cardboard or other similar material. The deployment member serves to facilitate deployment of the cord cover onto one or more electrical cords, as well as to provide a visually appealing product to the consumer.

Additionally, a method for applying the cord cover onto the deployment member is provided comprising the steps, generally, of providing a cord cover and deployment member as disclosed in the present invention, inverting the cord cover so as to expose the interior surface of the tubular cover, inserting the inverted cord cover into the interior of the hollow deployment member, righting the inverted cord cover as it passes through the interior of the deployment member, and sliding the righted cord cover, concurrent with righting the inversion, onto the exterior surface of the deployment member.

Furthermore, in conjunction with the utilization of a deployment member, methods for deploying the cord cover from the deployment member onto one or more electrical cords is provided comprising, generally, providing a cord cover and deployment member as disclosed in the present invention, inserting one or more electrical cords into the interior of the hollow deployment member, sliding the cord cover off of the exterior surface of the deployment member and onto one or more electrical cords, and removing the deployment member by extracting the electrical cord(s) from the interior of the hollow deployment member.

PREFERRED EMBODIMENTS OF THE INVENTION

In the following detailed description of the preferred embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

Figure 1:
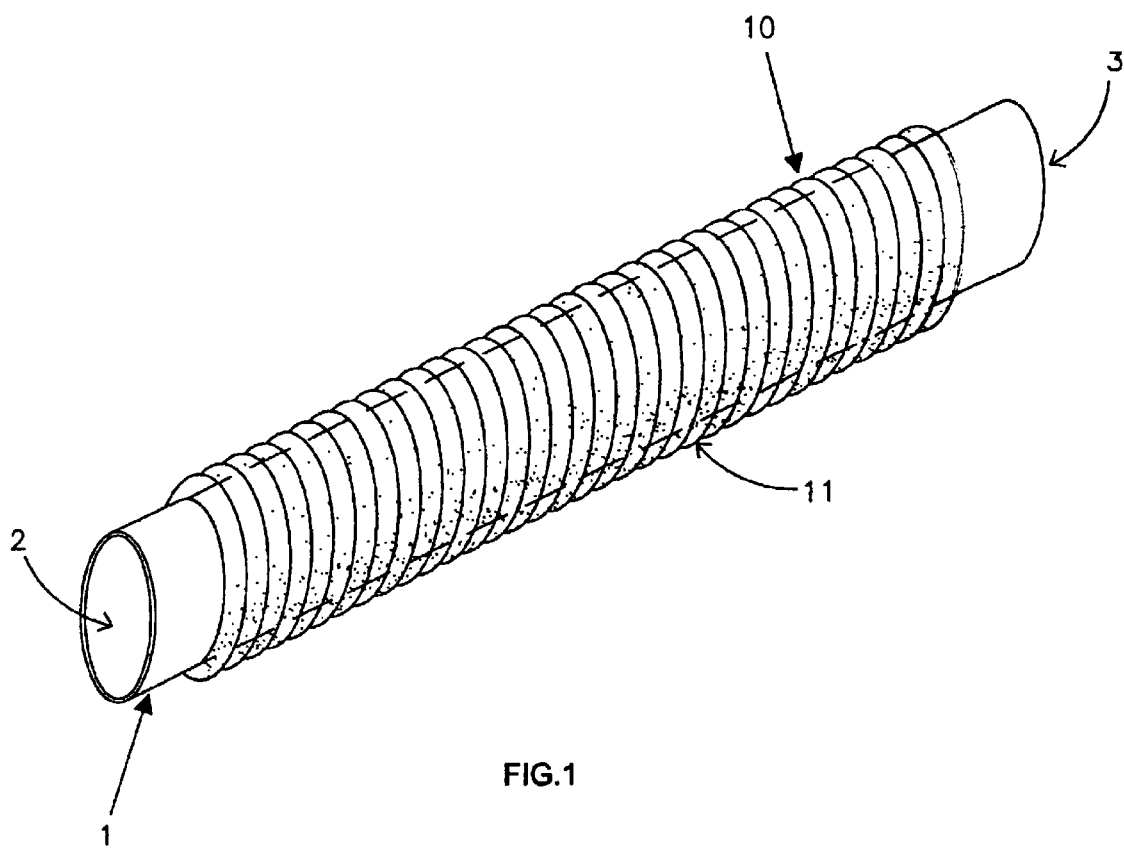
FIG. 1 is a side perspective view of one preferred embodiment of a decorative cord cover installed on a deployment member.

As shown in FIG. 1, a decorative cord cover 10 is installed around a deployment member 1. The deployment member 1 is preferably cylindrical, and is preferably constructed of cardboard, plastic, or other rigid but inexpensive material. The deployment member 1 has a first open end 2, a second open end 3, and a lengthwise opening 4 extending between the first and second open ends 2, 3. The total length of the deployment member 1 is significantly less than the total length of the decorative cord cover 10, which necessitates compressing the decorative cord cover 10 onto the deployment member 1 between the first and second open ends of the deployment member 1, in the manner shown in FIG. 1. Compression of the cord cover 10 on the deployment member forms small ridges in the fabric 11 that add to the aesthetic quality of the decorative cord cover 10 once deployed. In a preferred embodiment, the cord cover 10 is preferably at least four times longer than the deployment member 1 when the cord cover is in an uncompressed configuration. In a preferred embodiment, the cord cover is about nine feet long, while the cord cover is about one foot long. It is generally desirable to make the cord cover 10 as long as possible relative to the deployment member 1, while still allowing the cord cover 10 to be compressed entirely between the first and second open ends of the deployment member.

Figure 2:
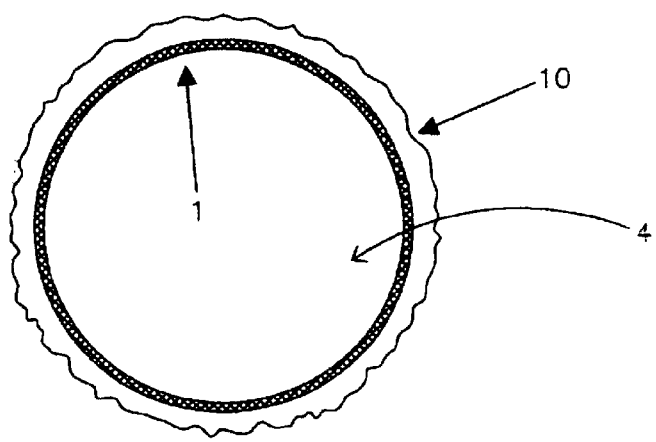
FIG. 2 is a front view of one preferred embodiment of a decorative cord cover installed on a deployment member.

FIG. 2 shows a side perspective view of the decorative cord cover 10 encircling the deployment member 1. The cord cover 10 tightly encircles the deployment member 1, such that the cord cover 10 does not readily fall off of the deployment member 1, but not so tightly that a user would have difficulty sliding the cord cover 10 off of the deployment member 1. The deployment member 1 is hollow, creating an interior space or lengthwise opening 4 of the deployment member 1.

The cord cover 10 is preferably constructed from a pliable material, such as linen, muslin, cotton, silk (e.g. dupioni silk), velvet (preferably stretch), satin, nylon, polyester, rayon, leather, and vinyl. Materials that include lycra (e.g. 10 percent lycra) have desirable stretching qualities for use in the invention. The pliable property is necessary in order to compress the cord cover 10 onto the deployment member 1. Thinner fabrics are preferred because they can be linearly compressed into a more compact configuration on the deployment member 1. The fabric material has a predetermined length and width. In a preferred embodiment, the cord cover has a length of nine (9) feet and a width of two to two and one half (2–2.5) inches, and has its longest edges permanently secured to form the tubular cover. A plurality of cords can be passed through the opening 4 when the cord cover is formed from a piece of fabric having a width of 2 to 2.5 inches. The cord cover 10 can be made from a wider piece of fabric, particularly for office applications, where it may be desirable to run seven or more chords through the cord cover 10. The edges are preferably sewn together using color coordinated thread to give the cord cover a seamless appearance.

Figure 3:
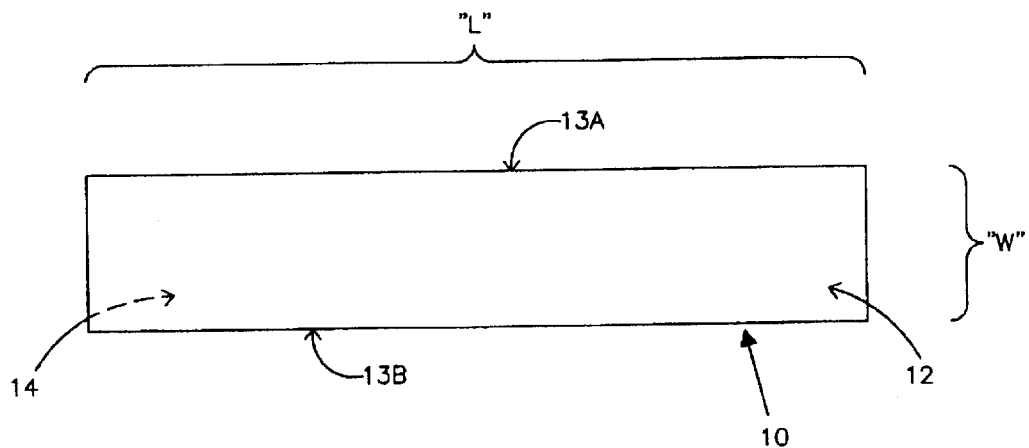
FIG. 3 is a top view of a lengthwise rectangular piece of fabric for use in fabricating a preferred embodiment of a cord cover.

FIG. 3 shows the decorative cord cover 10 prior to the permanent securing of the longest edges 13A, 13B, with a length "L" and a width "W". In the preferred embodiment, "L" is nine (9) feet and "W" is two to two and one half (2–2.5) inches, however, various lengths and widths may be used without departing from the spirit and scope of the invention. Upon securing the longest edges 13A, 13B of the decorative cord cover 10, an interior surface 14 and an exterior surface 12 are created.

Figure 4:
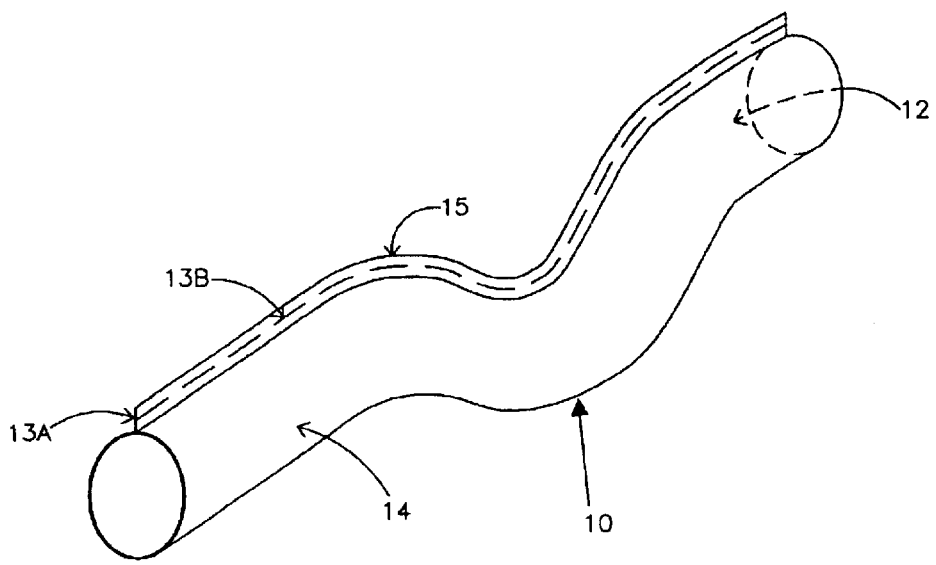
FIG. 4 is a perspective view of a cord cover in an inside-out configuration.

As seen in FIG. 4, the longest edges 13A, 13B of the decorative cord cover 10 are permanently secured to one another. In a preferred embodiment, the longest edges 13A, 13B are permanently secured using color coordinated sewing thread forming stitches 15. Note that immediately following the stitching of the longest edges 13A, 13B, the interior surface 14 of the decorative cord cover 10 is facing outwardly, while the exterior surface 12 is facing inwardly. In other words, the decorative cord cover 10 is inverted. Although the cord cover 10 is preferably formed from a rectangular sheet of fabric in the above described manner, the cord cover could be manufactured in a seamless configuration, using known techniques such as those that are used to manufacture socks and other tubular forms of fabric. Elastic properties can be included in the fabric, such that the cord cover normally contracts axially around the electrical cord or the deployment member 1.

Figure 5:
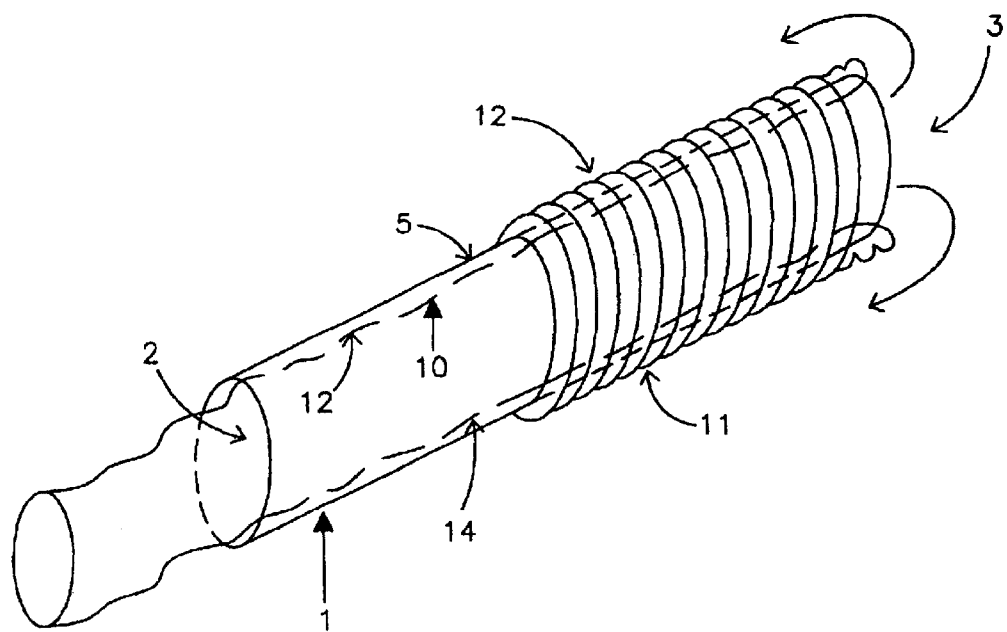
FIG. 5 is a perspective view showing a method of installing a cord cover on an outer surface of a deployment member.

FIG. 5 illustrates a preferred method of applying the decorative cord cover 10 onto the deployment member 1. The inverted decorative cord cover 10 is inserted through the first open end 2 and subsequently dispatched through the second open end 3 of the deployment member 1. As the inverted decorative cord cover 10 is dispatched through the second open end 3 of the deployment member 1, the inverted decorative cord cover 10 is concurrently righted and slidingly applied to the exterior surface 5 of the deployment member 1. This method of applying the cord cover 10 onto the deployment member 1 works particularly well with cord covers 10 having a lengthwise seam of stitches, since it places the cord cover 10 inside-in with the seam on the interior of the cord cover 10.

Figure 6:
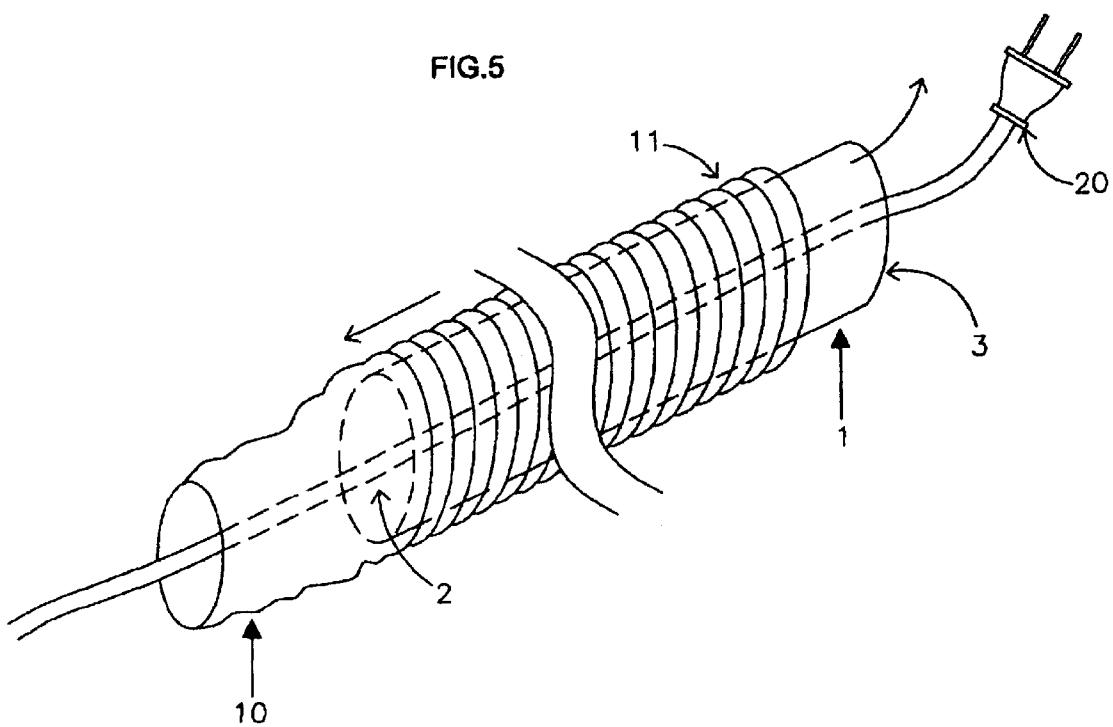
FIG. 6 is a perspective view showing a method of removing the decorative cord cover from the deployment member onto one or more electrical cords and of extracting the electrical cord or cords from the interior of the deployment member.
Figure 7:
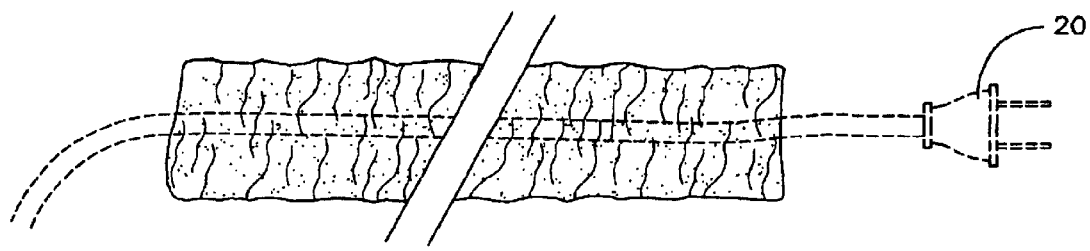
FIG. 7 is a cutaway top view showing a cord cover deployed over an electrical cord.
Figure 8:
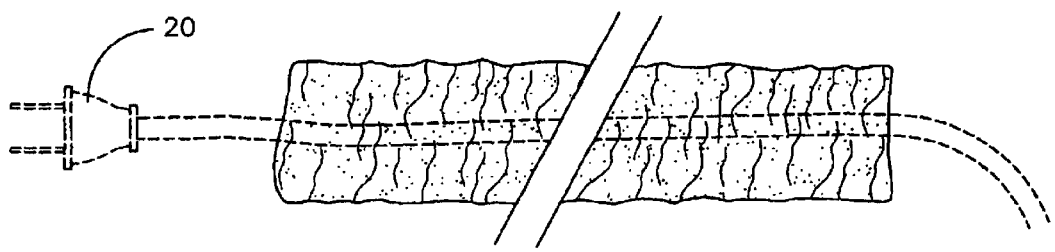
FIG. 8 is cutaway bottom view showing a cord cover deployed over an electrical cord.
Figure 9:
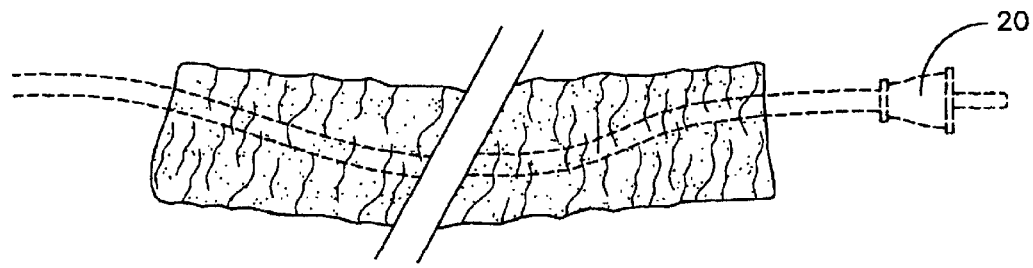
FIG. 9 is a cutaway side view showing a cord cover deployed over an electrical cord.
Figure 10:
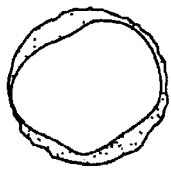
FIG. 10 is a front view of a cord cover deployed over an electrical cord.
Figure 11:
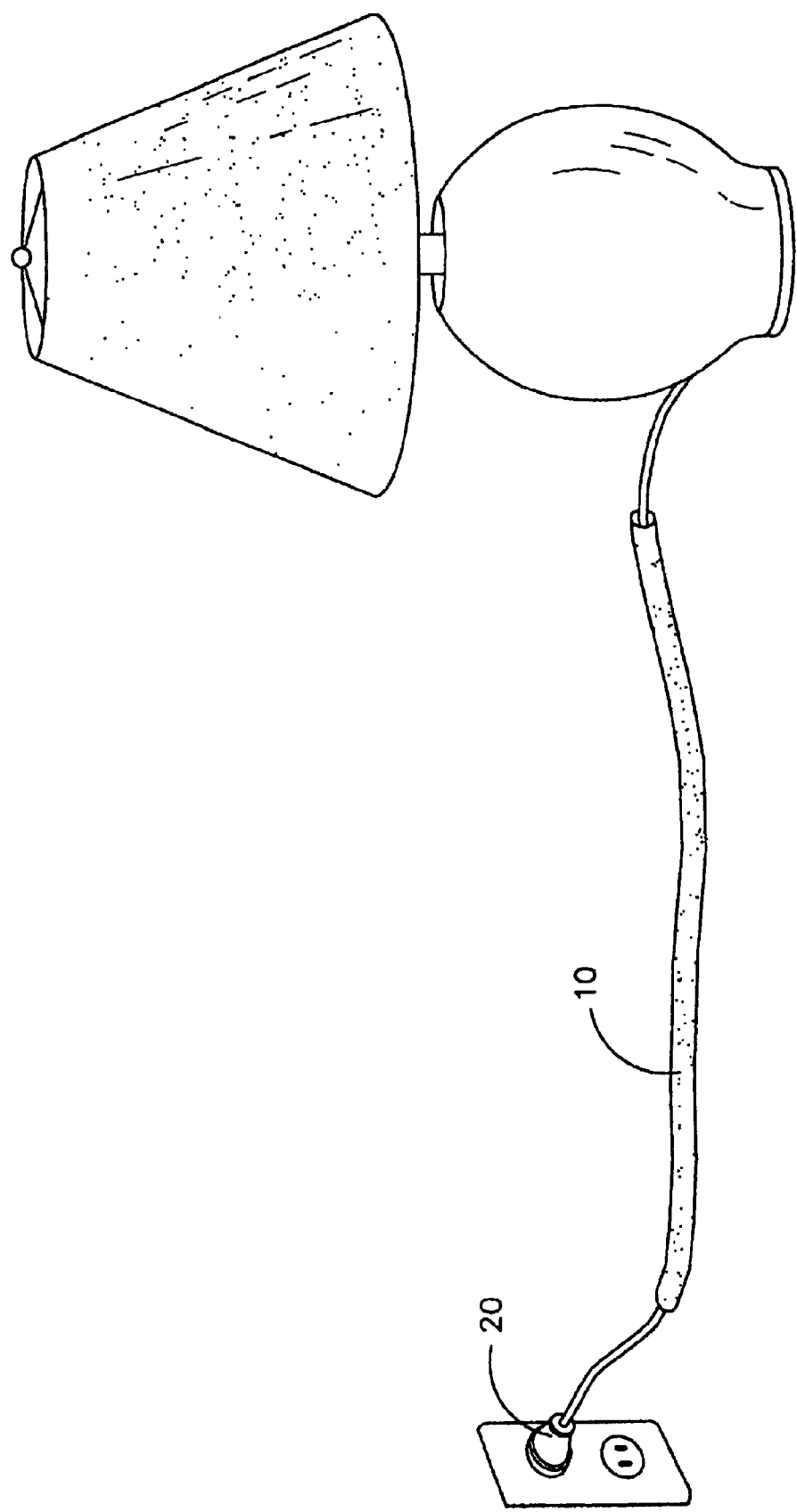
FIG. 11 is a side view showing a cord cover of the invention deployed over an electrical cord.

FIG. 6 illustrates the deployment of the decorative cord cover 10 from the deployment member 1 onto one or more electrical cords 20. One or more electrical cords 20 are inserted through the deployment member 1 via the first open end 2 and second open end 3. The cord covers 10 can also be used to cover other types of plug-in cords and lines, such as telephone lines, coaxial cables, and the like. As used herein, the term "electrical cord" includes all such lengthwise plug in cords, lines and cables that are used in home and office settings. Once one or more electrical cords 20 are inserted through the deployment member 1, the decorative cord cover 10 is deployed by slidingly removing the decorative cord cover 10 from the deployment member 1 onto one or more electrical cords 20. After the decorative cord cover 10 is removed from the deployment member 1, the electrical cord or cords 20 are removed from the interior of the deployment member 1. The decorative cord cover 10 can then be stretched to cover a desired length of one or more electrical cords 20. The deployment member 1 can be saved by the consumer for storage of the cord cover 10 when not in use.

The use of permanently enclosed cord cover 10 results in a more aesthetically pleasing cover than prior art embodiments that employ a fastening mechanism. Although the cord cover 10 is intended primarily as a decorative cover, it serves utilitarian functions as well. The cord cover 10 serves to hold a plurality of electrical cords together, and provides an additional degree of protection to the enclosed electrical cords. Additionally, permanently enclosed cord covers 10 can be manufactured more simply and inexpensively than prior art covers that incorporate a fastening mechanism. Through use of the deployment member 1 and the methods described herein, the permanently enclosed cord cover 10 can be readily used to cover electrical cords of the plug-in variety.

Although the present invention has been described in terms of specific embodiments, it is anticipated that alterations and modifications thereof will no doubt become apparent to those skilled in the art. It is therefore intended that the following claims be interpreted as covering all alterations and modifications that fall within the true spirit and scope of the invention.

What is claimed is:

1. A device for jacketing an electrical cord in a cord cover, the electrical cord having a wall outlet plug on one end thereof, comprising:

a cord cover deployment member, said deployment member comprising a lengthwise tube of substantially rigid material having first and second opposing open ends and a lengthwise opening passing entirely therethrough between said first and second open ends, said lengthwise opening sized to allow the wall outlet plug of the electrical cord to pass entirely through said deployment member, a cord cover, said cord cover comprising a lengthwise permanently enclosed tube of pliable material having first and second opposing open ends and a lengthwise opening passing entirely therethrough between said first and second open ends, said lengthwise opening of said cord cover sized to tightly encircle an outer surface of said deployment member, said cord cover being at least four times longer than said deployment member when said cord cover is in a linearly uncompressed configuration, said deployment member inserted in said lengthwise opening of said cord cover such that said cord cover envelops said deployment member, said cord cover linearly compressed along said outer surface of said deployment member such that said cord cover is positioned entirely between said first and said second ends of said deployment member, and said cord cover formed from a linear rectangular strip of fabric, a pair of opposing lengthwise edges of said strip of fabric permanently attached to one another via a lengthwise seam of stitches to thereby form said permanently enclosed tube, said seam of stitches is formed along an inner surface of said cord cover.

2. The device of claim 1, wherein said cord cover is cylindrical.

3. The device of claim 2 wherein said hollow deployment member is cylindrical.

4. A method of installing a cord cover onto an electrical cord comprising:

providing a device for jacketing an electrical cord according to claim 1, threading a plug end of an electrical cord entirely through said lengthwise opening of said deployment member, sliding said cord cover off of said deployment member and onto said electrical cord to thereby encircle said electrical cord with said cord cover, removing said deployment member from said electrical cord, and stretching said cord cover out along said electrical cord to thereby cover a substantial length of said electrical cord with said cord cover.

5. The method of claim 4, further comprising plugging a plug of said electrical cord into an electrical outlet without removing said cord cover from said electrical cord.

6. A method of applying a cord cover onto a cord cover deployment member for subsequent use in applying the cord cover around an electrical cord having a wall outlet plug comprising:

providing a cord cover deployment member, said deployment member comprising a lengthwise tube of substantially rigid material having first and second opposing open ends and a lengthwise opening passing entirely therethrough between said first and second open ends, said lengthwise opening sized to allow a wall outlet plug of an electrical cord to pass entirely through said deployment member, providing a cord cover, said cord cover comprising a lengthwise permanently enclosed tube of pliable material having first and second opposing open ends and a lengthwise opening passing entirely therethrough between said first and second open ends, said lengthwise opening of said cord cover sized to tightly encircle an outer surface of said deployment member, said cord cover being at least four times longer than said deployment member when said cord cover is in a linearly uncompressed configuration, threading said deployment member through said lengthwise opening of said cord cover such that said cord cover envelops said deployment member, linearly compressing said cord cover along said outer surface of said deployment member such that said cord cover is positioned entirely between said first and said second ends of said deployment member, wherein said cord cover is formed from a linear rectangular strip of fabric, a pair of opposing lengthwise edges of said strip of fabric permanently attached to one another via a lengthwise seam of stitches to thereby form said permanently enclosed tube, said seam of stitches is formed along an inner surface of said cord cover.

7. A method of applying a cord cover onto a cord cover deployment member for subsequent use in applying the cord cover to an electrical cord having a wall outlet plug comprising:

provided a cord cover deployment member, said deployment member comprising a lengthwise tube of substantially rigid material having first and second opposing open ends and a lengthwise opening passing entirely therethrough between said first and second open ends, said lengthwise opening sized to allow a wall outlet plug of an electrical cord to pass entirely through said deployment member, providing a cord cover, said cord cover formed from a linear rectangular strip of fabric having a pair of opposing lengthwise edges, said opposing lengthwise edges permanently attached to one another via a lengthwise seam of stitches to thereby form a permanently enclosed tubular member having a lengthwise opening therethrough, said seam of stitches exposed along an inner surface of said cord cover, said lengthwise opening of said cord cover sized to tightly encircle an outer surface of said deployment member, said cord cover being at least four times longer than said deployment member when said cord cover is in a linearly uncompressed configuration, turning said cord cover inside-out such that said inner surface and said stitches of said cord cover are externally exposed, inserting a first end of said inside-out cord cover into said first open end of said lengthwise opening of said deployment member, threading said first end of said inside-out cord cover entirely through said lengthwise opening of said deployment member, retrieving said first end of said inside-out cord cover from said second open end of said deployment member, after retrieving said first end of said inside-out cord cover from said second open end of said deployment member, turning said cord cover inside-in by folding said first end of said cord cover around said second end of said deployment member and then pulling said cord cover over said outer surface of said deployment member toward said first end until said second end of said cord cover exits said second open end of said deployment member, to thereby encircle said deployment member with said cord cover, said seam of stitches being sandwiched between said outer surface of said deployment member and said inner surface of said cord cover, and linearly compressing said cord cover along said outer surface of said deployment member such that said cord cover is positioned entirely between said first and said second ends of said deployment member.

* * * * *